United States Patent [19]

Nilsson et al.

[11] Patent Number: 5,115,511
[45] Date of Patent: May 19, 1992

[54] ARRANGEMENT FOR LOADING THE PARAMETERS INTO ACTIVE MODULES IN A COMPUTER SYSTEM

[75] Inventors: Sven-Axel Nilsson, Deisenhofen, Fed. Rep. of Germany; Ronald J. Ebersole, Beaverton, Oreg.; Gerhard Bier, Herxheim; Karl-Heinz Honeck, Essingen, both of Fed. Rep. of Germany

[73] Assignees: Siemens AK., Berlin, Fed. Rep. of Germany; Intel Corporation, Santa Clara, Calif.

[21] Appl. No.: 522,474

[22] Filed: May 11, 1990

Related U.S. Application Data

[63] Continuation of Ser. No. 94,234, Sep. 8, 1987, abandoned.

[51] Int. Cl.⁵ .............. G06F 13/20; G06F 13/40; G06F 13/42; G06F 13/14
[52] U.S. Cl. .............. 395/800; 364/232.8; 364/237.9; 364/238.3; 364/238.5; 364/239; 364/239.8; 364/239.9; 364/240.5; 364/241.9; 364/DIG. 1
[58] Field of Search ... 364/200 MS File, 900 MS File

[56] References Cited

U.S. PATENT DOCUMENTS

| | | | |
|---|---|---|---|
| 4,096,571 | 6/1978 | Vander Mey | 364/200 |
| 4,215,400 | 7/1980 | Denko | 364/200 |
| 4,236,207 | 11/1980 | Rado et al. | 364/200 |
| 4,387,442 | 6/1983 | Stuehler | 364/900 |
| 4,484,273 | 11/1984 | Stiffler et al. | 364/200 |
| 4,491,916 | 1/1985 | Vallhonrat | 364/200 |
| 4,562,532 | 12/1985 | Nishizawa et al. | 364/200 |
| 4,571,676 | 2/1986 | Mantellina et al. | 364/200 |
| 4,589,063 | 5/1986 | Shah et al. | 364/200 |
| 4,677,586 | 6/1987 | Magar et al. | 364/900 |
| 4,701,878 | 10/1987 | Gunkel et al. | 364/900 |
| 4,868,784 | 9/1989 | Marshall et al. | 364/900 |

Primary Examiner—Thomas C. Lee
Assistant Examiner—Daniel Pan
Attorney, Agent, or Firm—Volker R. Ulbrich; Owen L. Lamb

[57] ABSTRACT

In a computer system having a configuration which is subject to change, because of failure replacement, updating, or expansion, it is necessary to provide means for loading parameters carrying the present system configuration into the active modules of the system. In this manner, all parallel processors are identified and recognized and depending upon system demands, used because of the parameter loading arrangement of this computer system. Serial lines are provided for loading the parameters into the active modules.

6 Claims, 3 Drawing Sheets

ARRANGEMENT FOR LOADING THE PARAMETERS INTO ACTIVE MODULES IN A COMPUTER SYSTEM This is a continuation of application Ser. No. 094,234, filed Sep. 8, 1987, now abandoned.

FIELD OF INVENTION

This invention relates to the field of data processing equipment and more particularly to an apparatus for loading the operating parameters into the active modules of such a data processing system.

BACKGROUND

When starting and operating a computer system, it is necessary to supply critical parameters to the assemblies or to the active modules in the system assemblies, in order to assure a real-time information status regarding the system configuration, particularly in reference to the processor modules. It is, for example, important that it is known within the system how many processor modules, conceivably with varying tasks, are available so that parallel processing or redundant operation can be properly organized. Moreover, information regarding the type of assembly, e.g., data processor assembly or input/output processor assembly, the assembly production model or whether or not the assemblies are plug-in assemblies, is extremely important for the active modules. A direct parallel connection of each module through readable input ports is disadvantageous given the only limited availability of connections and the required processing time for this information. Similarly, reading in of the information using the existing data and address bus is very cumbersome because special decoders are needed so that the parallel-coded information included in the standard bus protocol is made readable for the modules.

SUMMARY OF THE INVENTION

It is the object of this invention to provide an arrangement for loading the parameters of active modules in a computer system. It is another object of the invention to provide the loading of the operating parameters simply and without the use of the bus systems required for main data processing functions.

Briefly stated in accordance with one aspect of the invention, the foregoing objects can be achieved by providing an arrangement for identification and parameter loading of active modules of computer card assemblies used with a computer system, including at least one parameter controller each having a plurality of input ports, each parameter controller receiving through a first port of said plurality of input ports digitally coded information on data specific to said computer card assembly. A second port of said plurality of input ports is provided for receiving digitally coded, system support information. Also included are an output port, and output connecting means interconnecting the computer card assemblies of the computer system, through which digital signals identifying said computer card assemblies are conducted. And at least one of a plurality of internal registers are included in each active module of each computer card assembly into which is respectively serially loaded digitally coded system support information.

By means of this arrangement, wherein each assembly has at least one parameter control module, a centralized allocation of parameters to the active modules by serial read-in, into 32 bit wide registers for example, can be achieved in an advantageous fashion. The digitally coded information which can be input at the input port of the parameter control module is processed and supplied to the modules in a defined bit configuration, resulting in each module having an image of its environment, namely the entire computer system. Similarly, a feedback of the image of the status in the module to the parameter control modules, and from there to the entire system, is possible, for example, with respect to errors; thereby, error messages or interrupts can be effected by means of the parameter control module.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawing, in which:

DESCRIPTION OF A PREFERRED EMBODIMENT

Figure 1:
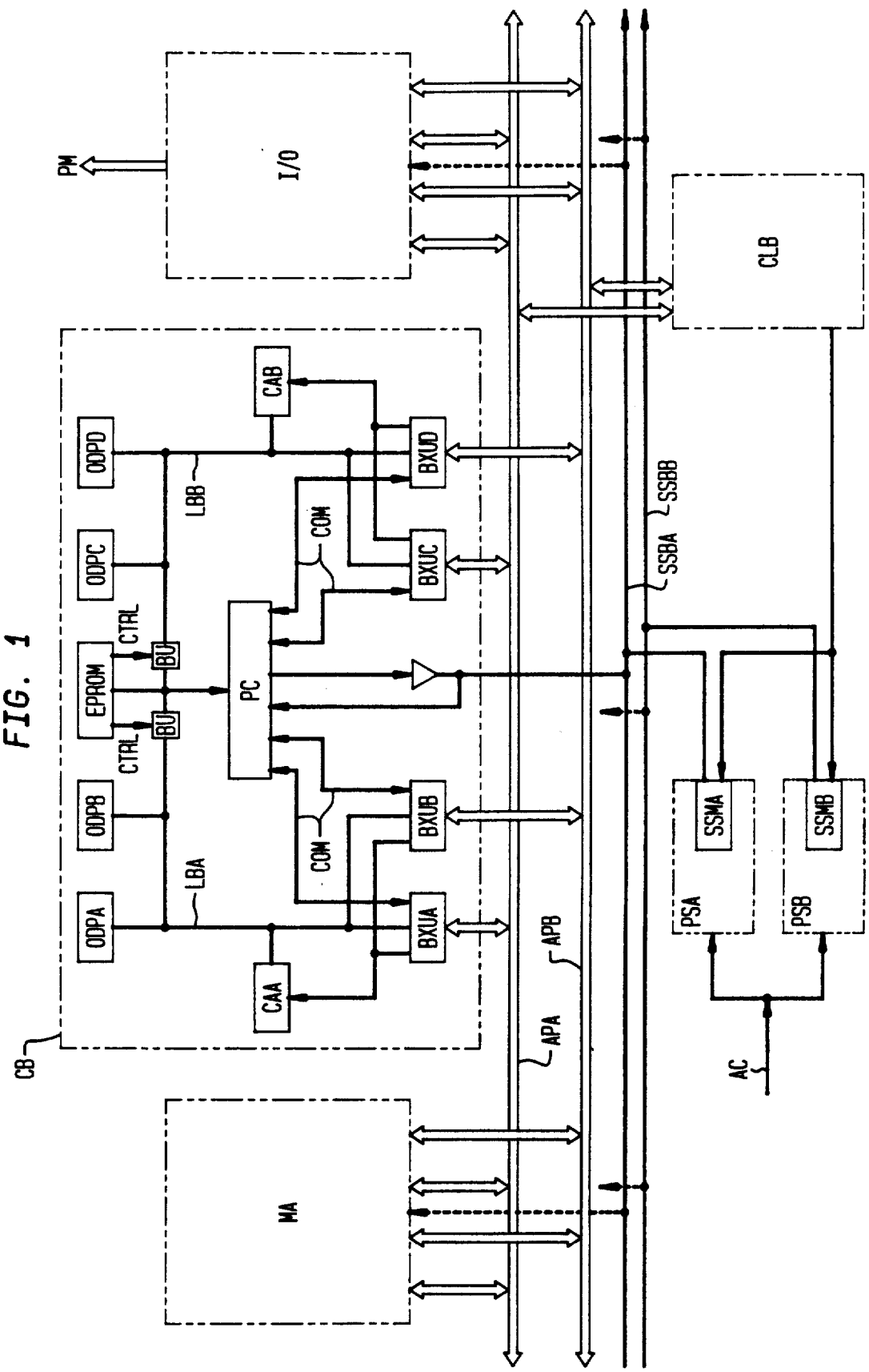
FIG. 1 depicts a diagram of an embodiment of a high availability computer system.

FIG. 1 is an illustration of an embodiment of the computer system. This block diagram shows the functional details of a computer printed circuit board, the computational board CB, having four processor modules GDPA, GDPB, GDPC and GDPD, where GDP stands for general data processor. The processor modules are designed as VLSI components.

In the circuit shown in FIG. 1, the processor modules GDPA and GDPB are connected by a local bus LB to bus extension units BXUA and BXUB, and the processor modules GDPC and GDPD are connected by a local bus LB to bus extension units BXUC and BXUD. Each of the bus extension units BXUA and BXUC are further connected to a system bus APA, and each of the bus extension units BXUB and BXUD are further connected to a system bus APB. In addition to the external coupling function, a Master or Checker function is assigned to the bus extension units; in the embodiment of FIG. 1, BXUA and BXUC preferably form a Master/Checker pair and BXUB and BXUD preferably form a Master/Checker pair. Processors GDPA and GDPB are Master units; processors GDPC and GDPD are Checker units; Local bus LBA is the Master bus; and Local bus LBB is the Checker Bus.

In a further function block, not shown in more detail, a memory array MA; with the corresponding memories, e.g. PROM and RAM and associated controllers, is shown. This memory array MA provides the addressable memory of the computer system. The bus extension units BXUA and BXUB are, furthermore, each connected via a communications line COM to a parameter controller PC, and the bus extension units BXUC and BXUD are each connected via a communications line COM to the parameter controller PC. The parameter controller may be, for example, an Intel 8051 microprocessor. Applied to other inputs of the parameter controller PC, certain parameters of the computer card can be set from outside by means of digital loading means as well as by means of data stored in an EPROM. By means of an output, not shown here, of the parameter controller PC, an error-message unit can be connected. Thus, if an error occurs in the modules monitored by the parameter controller PC, the error-message unit can issue an error signal. The input of the parameter controller connected to the memory array EPROM is connected via a buffer BUA to the local bus LBA of the first pair of processor modules GDPA and GDPB, i.e., Master modules, and by a buffer BUB to the local bus LBB of the second pair of processor modules GDPC and GDPD. Furthermore, control lines, i.e., ctrl, are present between the buffer BUA and the memory array EPROM and between the buffer BUB and the said memory array EPROM.

FIG. 1 further shows two serial system support buses SSBA and SSBB, by means of which the parameter controllers PC of the several computer cards are connected to one another. With this redundant embodiment of the system support buses SSBA and SSBB, redundant embodiments of each of the computer cards MA, CB and I/O, not shown here, are connected to the second bus SSBB. A detailed functional description of the modules illustrated in FIG. 1 follows below.

Also in FIG. 1, on the right-hand side, there is a further block representing the input-output module I/O of the computer system described here, the circuitry not being treated in detail at this point. This I/O module accomplishes the connection of the computer system to peripherals PM by means of well-defined communications protocols, e.g., Ethernet, etc.

The bottom part of FIG. 1 shows an overall design with two power supply modules PSA and PSB, both of the same type, and with the power supply lines AC. In addition to the DC power supply connections, the power supply modules PSA and PSB exhibit two system support modules SSMA and SSMB, each of which is provided with a microprocessor such as an Intel 8051. Outputs of the system support modules SSMA and SSMB are connected to the system support buses SSBA and SSBB respectively. Furthermore, the system support modules SSMA and SSMB are supplied with the system clock pulses from a clock board CLB by means of clock lines.

Figure 2:
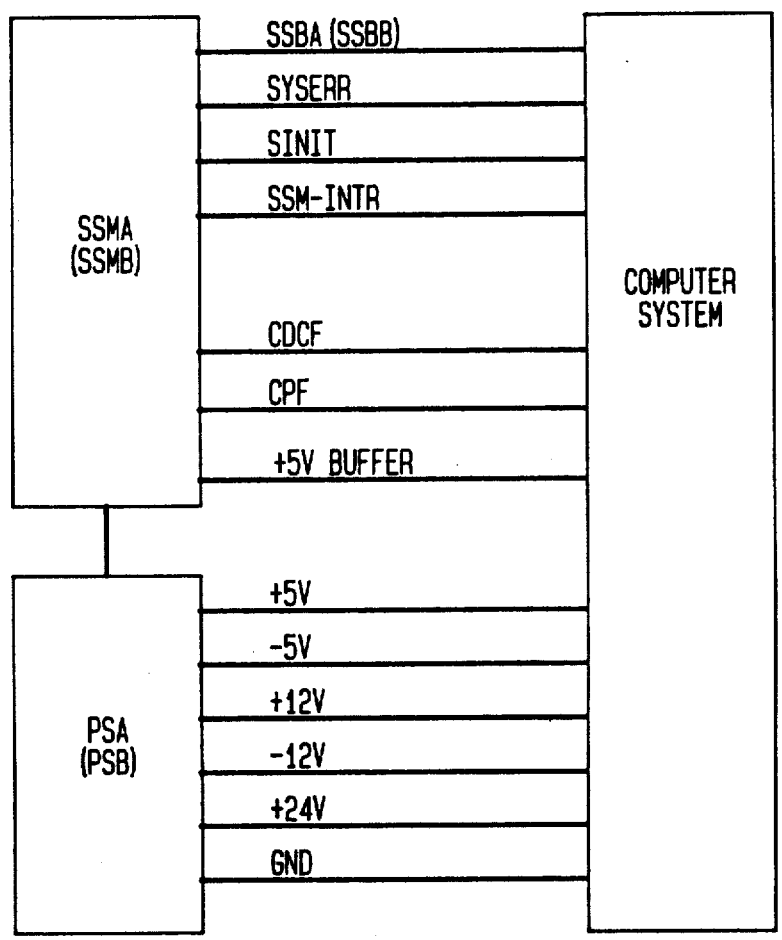
FIG. 2 shows a connection schematic for the connections between a power supply system and the computer systems.

In FIG. 2, the interconnections of one of the power supply modules PS described in FIG. 1 are illustrated. The top portion shows the system support connections between the computer system CS and the respective system support modules SSMA and SSMB, some of which have already been mentioned in connection with FIG. 1. Shown here are the connections to the system support buses SSBA and SSBB, which are responsible for all monitoring functions and certain control functions relating to the functioning of the power supply modules PSA and PSB, respectively. In order to keep the number of interconnecting lines small, signal exchange on this line is serial; this is possible because the signals being transmitted here are not, as a rule, time-critical, for example, the DC or AC on/off signal.

In the present preferred embodiment, each of the serial line interconnections SSB is redundantly duplicated, so that non-stop operation is possible if one line fails.

The interconnecting line SYSERR between the power supply module PS and the computer system serves to signal an error occurring in a system component, for example by means of a LOW signal, and causes a corresponding display on the control panel on the power supply module PS.

The entire system can be initialized over the interconnecting line SINIT, for example with a LOW signal. A further function of this signal is to determine the time at which the basic initialization phase is to end. This is the time when the SINIT signal is HIGH and each system card must end basic initialization, for example 512 system clock pulses, or approximately 16 microseconds, after the rising edge of the SINIT signal. The signal on this interconnecting line SINIT is initiated if, for example, the line power is turned on, the "watchdog timer" indicates an overrun of alloted time, or the RESET button is pressed.

The interconnecting line SSM-INTR allows a system interrupt signal to be transmitted to various components. This action can be induced, for example, by pressing an appropriate button on the control panel of the power supply module PS. This signal causes the processor modules to start the system monitor program, for example for test functions, without resetting.

The interconnecting line CDCF can transmit a LOW signal, which indicates that the DC output of the power supply module PS has failed. A DC failure may lead, for example after 50 microseconds, to a system failure.

Over the interconnecting line CPF the system is notified of an interruption in the AC at the input of the power supply module PS. For example, a LOW signal can be used to indicate that the system in failing after 2 milliseconds.

In the bottom part of the power supply module PS, shown in FIG. 2, the DC connections between the power supply module and the computer system are illustrated. Here the following outputs are made available to the computer system: $+/-5$ V, $+/-12$ V, $+24$ V, and a ground GND.

An important function during a cold or warm start of the entire computer system in an altered configuration from a previous configuration is initialization. Here all VLSI components and the other physical and logical system components must be identified, and parameters must be loaded into them.

After the system is switched on, i.e., a cold start or after part of the system is restarted, i.e., a warm start, initialization of all components under software or hardware control is carried out first during an INIT signal issued by the system support modules SSM or received over the system bus. There follows an identification phase, during which the identities of the VLSI components are established. Next, in the parameter loading phase, parameters are loaded into the appropriate registers of the VLSI components, preferably by means of the parameter controller PC. The parameters depend on the configuration of the system and on several controllable factors and may differ from the values imposed in the first phase of initialization. Both phases are executed principally over the COM pins of the VLSI components through serial loading of the registers in the components.

The physical identification mechanism, with appropriate commands, is controlled by a microcode implemented in the processor modules.

Figure 3:
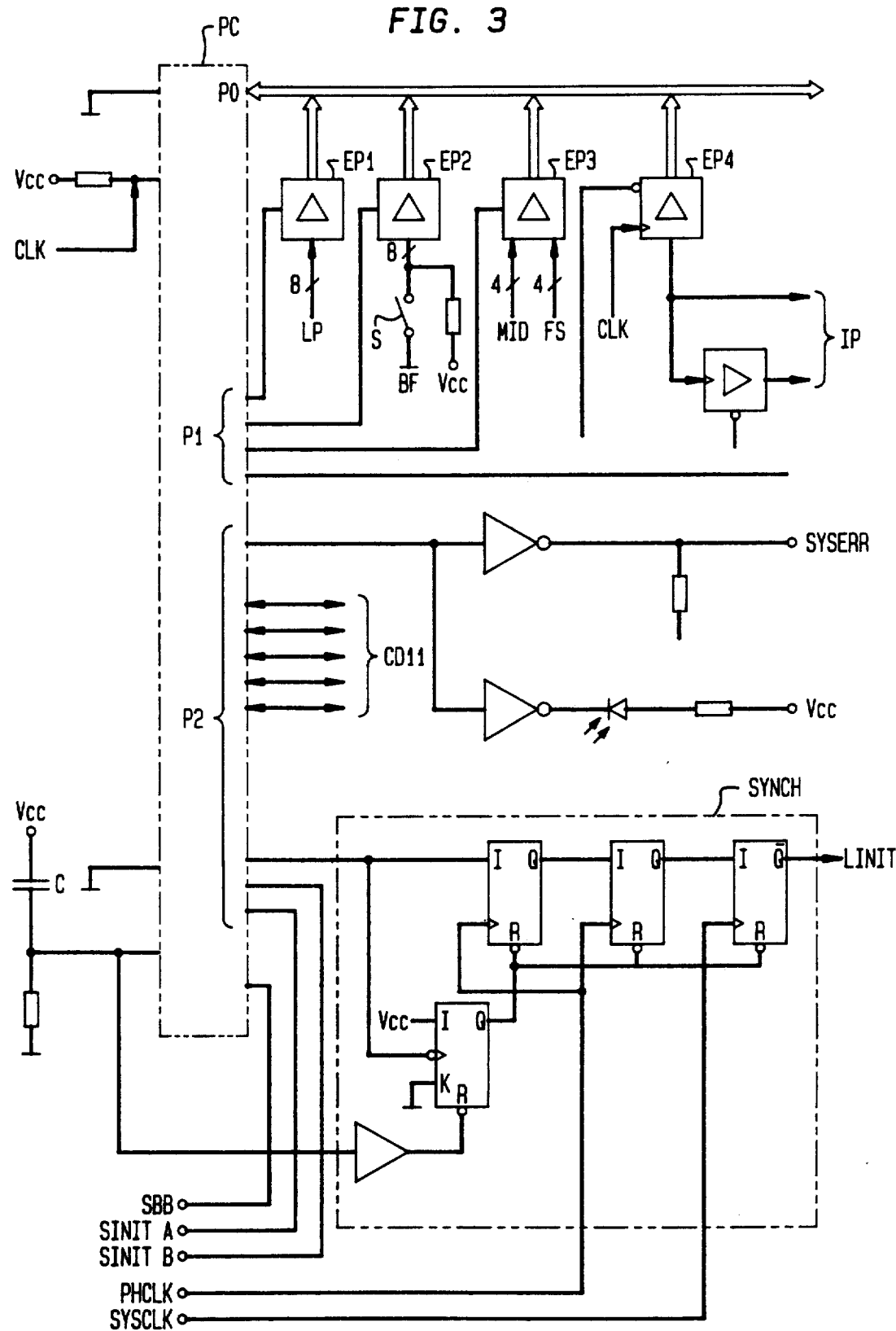
FIG. 3 shows diagrammatically an embodiment of a parameter control module.

FIG. 3 presents a detailed circuit diagram of a parameter controller PC with some of the external circuitry, such as is used in the computational board CB or on the input-output card I/O, i.e., PC/I, PC/II. The parameter controller PC here is a commercial 8-bit microprocessor, such as the Intel 8051. In the usual circuitry with a power supply Vcc and a clock signal PHCLK or SYSCLK, this module exhibits three 8-bit-wide ports, by which the system support functions can be carried out. Specific parameters as defined for the card can be input or received through the port P0 or P1. It is possible, for example, to use a module EP1 to specify configuration parameters, which are needed for repair or diagnostic work on the card. With the module EP2, the configuration of the card as a whole can be identified, for example by means of jumper connection S, which can then be inputted to the parameter controller PC by means of digitally coded words containing, for example, 6 bits, and which provide information about the capacity, number and type of memory modules for the processor modules GDPA to GDPD, as well as the model number of the card, such as, for example, computer system card CB or input-output card I/O.

Identification codes MID or error signals FS, for example, can be input or received by means of module EP3. Through module EP4, further initialization parameters can be supplied to the module to which it is connected.

Port P2 of the parameter controller PC also has, first, a pin, not described in more detail here, for connection with system error signals SYSERR and further, a number of communications connections COM to the individual COM pins of the bus extension units BXUA to BXUD on the card, through which communications connections the communications codes COM-WORDS are sent in serial mode to the COM pins.

These communications signals are from the evaluation of data which is received through ports P0 and P1 and may be structured as a data word COM-WORD comprising 32 bits such as:

```
Bit Number 31......24.....18...14..11..8....4.......0
         / xx/xxxxxx/xxxxxx/xxxx/xxx/xxx/xxxx/x/x/x/x/
```

Here, by way of example, the first group bits 31 and 30 designate the word number, so that four separately transmitted words can be identified, for example 00=word 0, 01=word 1, 10=word 2, 11=word 3. The second group, 6 bits wide, can be used to identify the type of card, for example, to designate whether the card is an input-output card I/O or a computer system card CB. The third group may contain 6 bits of information on the module configuration, for example, whether the design of the bus system or of the modules features error protection and how many processor modules GDP are present for a high-availability arrangement. The fourth group here represents spares. The fifth group designates the type of input-output system modules or the protocols required by the desired communication method, for example HDLC or V-36 or other modem interconnections. The next four bits, bits 7-4 represent an INIT counter, which keeps track of the number of warm starts after the replacement of cards and restarting. The next bit, bit 3, can be used to communicate to the system, for example, whether a buffer voltage is available, e.g., from a battery. The next three individual bits, bits 2-0, may contain further freely assignable codes relating to the processor modules or may contain parity bits. Other combinations of information transmitted to the COM pins on the modules are also possible here.

The further connections to the parameter controller PC are used to output the initialization signals LINIT/RESET or to receive the clock pulses PHCLK as phase clock signals, SYSCLK as system clock signals, or the system initialization signals SINITA and SINITB. With the help of the clock pulses PHCLK and SYSCLK, which are impressed on pulse inputs of flip-flop modules of a synchronization circuit SYNCH, a synchronous initialization signal LINIT can be generated on each card. There is also a connection to the system support bus SBB which creates a connection to other parameter controllers PC as shown in FIG. 1.

Another important task of the parameter controllers is the coupling or dissemination of the INIT signal to the processor modules GDP and the bus extension units BXU. In this way, identical processing of data in parallel processor modules GDP, for example, resetting to a well-defined initial state, is insured even if a system bus APA or APB is defective. The parameter controllers PC of the various cards communicate for this purpose by means of the serial system support bus SSBA or SSBB.

It will now be understood that there has been disclosed an improved arrangement for loading parameters into active modules of a computer system. As will be evident from the foregoing description, certain aspects of the invention are not limited to the particular details of the examples illustrated, and it is therefore contemplated that other modifications or applications will occur to those skilled in the art. For instance, a computer system that is dually redundant, i.e., having quad redundancy rather than the doubly redundant system described. This invention for loading of operating parameters would also have applications in non-redundant computer systems. It is accordingly intended that the claims shall cover all such modifications and applications as do not depart from the true spirit and script of the invention.

What is claimed as new and desired to be secured as Letters Patent of the United States is:

1. For use in a computer system, a combination comprising:
   a plurality of system assemblies (MA, CB, I/O);
   a serial system support bus (SSBA) connected to each of said system assemblies;
   each of said system assemblies having one or more active modules and a parameter controller thereon;
   a parameter controller (PC) on a particular system assembly (CB) including a first port (P0) for receiving digitally-coded, multi-bit words and a second port (P1) for sending digitally-coded, multi-bit words;
   first means (EP1, EP2, EP3, EP4) for specifying first configuration parameters which provide information specific to said active modules (BXUA, BXUB, . . . ) on said particular system assembly (CB) and specific to said particular system assembly (CB);
   said first means being connected to said first port (P0) such that parameters specific to said particular assembly (CB) can be inputted to said parameter controller;
   said parameter controller (PC) on a particular system assembly (CB) further including a third port (P2) connected to said one or more active modules (BXUA, BXUB, . . . ) on said system assembly (CB);

said parameter controller (PC) on a particular system assembly (CB) further including a connection means (SSB) to said system support bus (SSBA), said connection means (SSB) creating a connection to other parameter controllers on others (MA, I/O) of said plurality of system assemblies through said connection means (SSB) such that said system support information may be sent to said other parameter controllers on others (MA, I/O) of said plurality of system assemblies and other system support information may be received from said other parameter controllers on said others (MA, I/O) of said plurality of system assemblies;

said first means being connected to said second port (P1) such that said system support information can be inputted to said parameter controller;

said third port (P2) having a number of communication connections (COM) to said active modules (BXUA, BXUB, ...) on said system assembly (CB) through which serial communication codes (COM-WORDS) can be sent in a serial mode to a register at each active module to thereby load information derived from both said first configuration parameters and said system support information.

2. The combination in accordance with claim 1 wherein said parameter controller (PC) on said particular system assembly (CB) communicates an initialization signal (INIT) to another parameter controller on another system assembly (I/O) over said serial system support bus (SSBA).

3. The combination in accordance with claim 1 wherein said particular system assembly (CB) is a removeable computer card and said first means includes a plurality of alterable electrical jumper connections (S) by which digitally-coded information specific to the computer card is provided such that the configuration of the card as a whole can be identified by means of said connections (S) inputted to said parameter controller (PC).

4. The combination in accordance with claim 3 wherein said parameter controller (PC) on said particular system assembly (CB) communicates an initialization signal (INIT) to another parameter controller on another system assembly (I/O) over said serial system support bus (SSBA).

5. The combination in accordance with claim 4 wherein said communication codes (COM-WORDS) include an INIT counter which keeps track of the number of said initialization signals (warm starts) after replacement of said card (CB).

6. The combination in accordance with claim 1 wherein said register at each active module includes means for generating acknowledgements which are serially received at said third port (P2) via said communication connections (COM) in response to said serial communication codes (COM-WORDS), said acknowledgements being capable of initiating the generation of either an interrupt or an error-signal message within said computer system.

* * * * *